340-870.11
XR 3,076,184
Jan. 29, 1963    J. P. GLASS    3,076,184
COUNTER APPARATUS
Filed Jan. 30, 1959    2 Sheets-Sheet 1
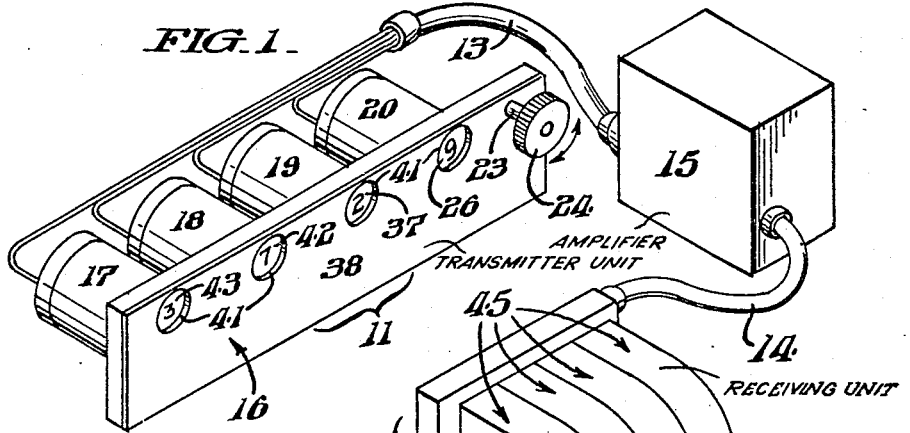
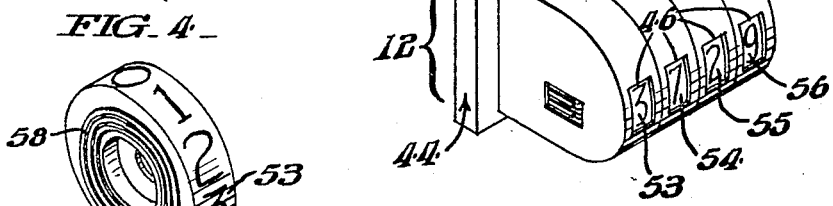
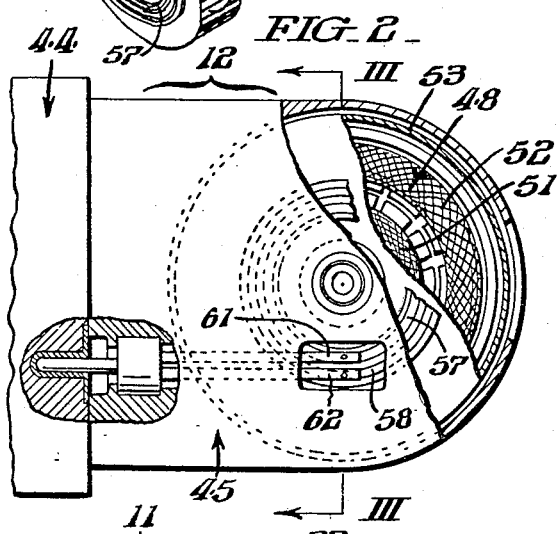
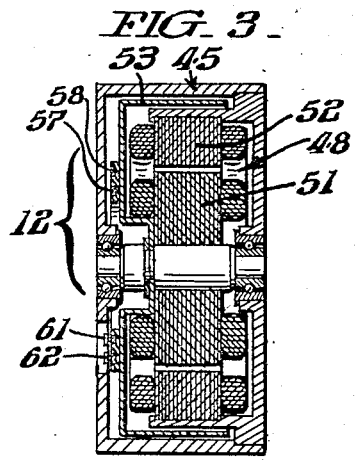
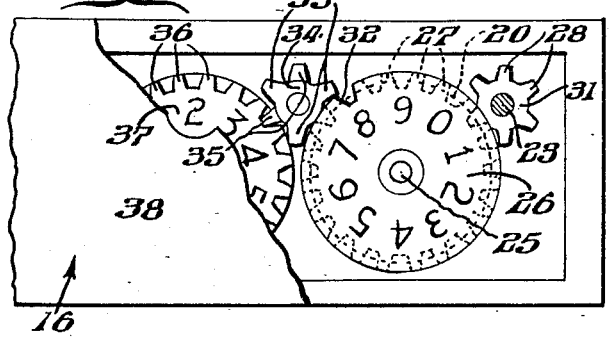
INVENTOR.
John P. Glass,
BY Paul & Paul
ATTORNEYS INVENTOR.
John P. Glass,
BY John F. A. Easley, Jr.
ATTORNEY

United States Patent Office 3,076,184
Patented Jan. 29, 1963

3,076,184
COUNTER APPARATUS
John P. Glass, 718 Lorraine Ave., Ardmore, Pa.
Filed Jan. 30, 1959, Ser. No. 790,166
7 Claims. (Cl. 340—198)

This invention relates to improvements in counter apparatus, and more particularly concerns counter apparatus having a remotely located read-out bank.

It has been a problem to provide a counter positioned in the cramped space of an airplane pilot's cockpit because of space limitations, and it has been a problem to provide such a counter having such a size that the numerals impressed thereon are large enough to be legible. Conventional counter apparatus is bulky, including a counter type gear train, indicating means which are disc shaped, and relatively large synchros.

It is an object of this invention to provide counter apparatus which overcomes the hereinbefore mentioned problem.

It is another object of this invention to provide counter apparatus having a remotely located read-out bank which is small and compact, yet which is provided with indicating numerals which are large and legible.

It is another object of this invention to provide counter apparatus which eliminates the necessity for a gear train at the read-out bank.

Other objects and advantages of this invention, including its simplicity and economy, as well as the ease with which it may be adapted to existing equipment, will further become apparent hereinafter and in the drawings, in which:

FIG. 1 is a view in perspective of counter apparatus constructed in accordance with this invention;

FIG. 2 is a side view, partly in section, of the read-out bank forming an element of the invention;

FIG. 3 is a view in section taken as indicated by the lines and arrows III—III which appear in FIG. 2;

FIG. 4 is a view in perspective of an indicating wheel of the read-out bank;

FIG. 5 is a front view of the transmitting unit of the invention with parts broken away in order to illustrate important details.

Figure 6:
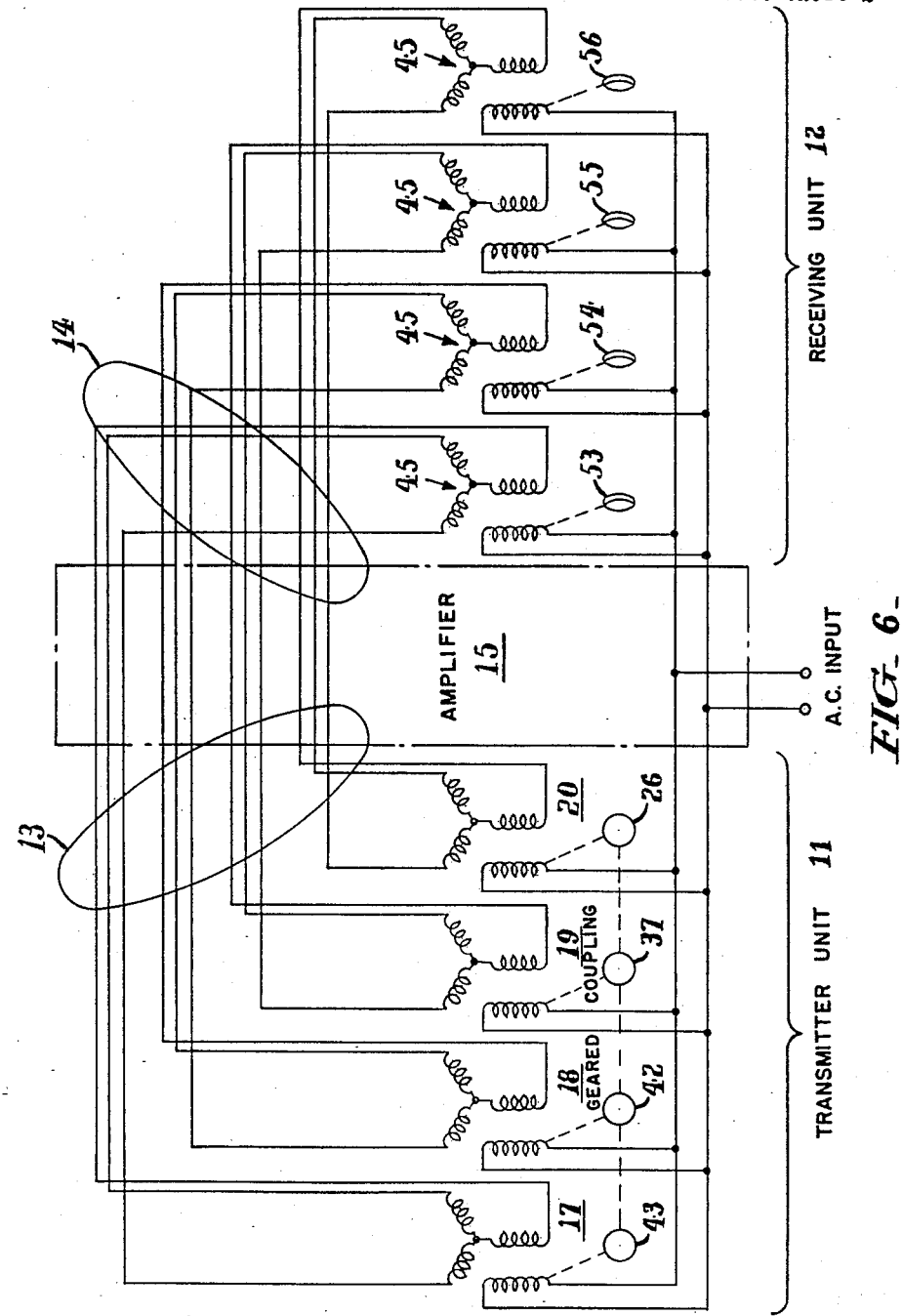
FIG. 6 is a diagrammatic view of the electrical circuit of the invention.

Although specific terms are used for clarity in the following description, these terms are intended to refer only to the structure shown in the drawings and are not intended to define or limit the scope of the invention.

Turning now to the specific embodiment of the invention selected for illustration in the drawings, there is shown counter apparatus including a transmitting unit 11 and a receiving unit 12 which are connected together by electrical conductors 13, 14. An amplifier 15 is located between conductors 13 and 14 to assure positive tracking or indexing of the receiving unit 12.

Transmitting unit 11 includes a support plate 16 having mounted thereon a number of synchros 17, 18, 19, and 20, and an input shaft 23 with an input knob 24.

Mounted on rotor shaft 25 of synchro 20 is an indicating disc 26 having numerals marked thereon. Disc 26 is provided with teeth 27 which mesh with the teeth 28 of gear 31 which is mounted on input shaft 23. Disc 26 is also provided with a tooth indent 32 which meshes with teeth 33 of carry-over pinion 34. Each revolution of disc 26 revolves carry-over pinion 34 one third of a revolution and teeth 35 of carry-over pinion 34 mesh with teeth 36 of indicating disc 37 to move disc 37 through an arc of thirty-six degrees to index one digit. Support structure 16 is provided with a support plate 38 having apertures 41 formed therein through which the numerals on the discs 26, 37, 42, and 43 are read.

Receiving unit 12 includes a support structure 44 on which are mounted a series of receiving synchro casings 45. Located within each casing 45 is a receiving synchro 48, consisting of rotor 51 and stator 52. Each rotor 51 is provided with an indicating wheel, and the indicating wheels are designated by the numerals 53 through 56. On the side of each indicating wheel 53–56 there is provided a pair of conducting rings 57 and 58 which make contact with electrical terminals 61 and 62. Terminals 61, 62 are made of spring material so as to assure good electrical contact, and conducting rings 57 and 58 are electrically connected to the coil of rotor 51. Numerals on indicating wheels 53–56 are read through apertures 46.

In the example illustrated, the read-out bank 12 consists of four receiving synchros with indicating wheels 53–56, but a different number of receiving synchros may be used as desired. The individual receiving synchros in their casings 45 are easily replaceable. It is noted that the indicating wheel 56 corresponds to and repeats the indication of indicating disc 26; indicating wheel 55 corresponds to and repeats the indication of indicating disc 37; indicating wheel 54 corresponds to and repeats the indication of indicating disc 42; and indicating wheel 53 corresponds to and repeats the indication of indicating disc 43.

In operation of the counter, the input shaft 23 may be rotated in either direction, continuously or intermittently. Its input is visually indicated on discs 26, 37, 42, and 43 which are mechanically connected to each other through a mechanical-counter gear train. One complete revolution of indicating disc 26 is translated by carry-over pinion 34 to indicating disc 37. Similarly, the rotation of disc 37 is translated to disc 42, and the rotation of disc 42 is translated to disc 43. Since discs 26, 37, 42, and 43 are mounted on the rotors of transmitting synchros 17–20, an electrical signal is transmitted from each of the transmitting rotors 17–20 to the rotors 51 of the corresponding receiving synchros 48 so that the position of indicating wheels 53–56 correspond to the position of indicating discs 43, 42, 37, and 26, respectively.

It is to be noted that carry-over pinion 34 locks indicating disc 37 in position when tooth indent 32 is not occupied by one of the teeth 33.

The individual angular position of a rotor of the transmitting synchros 17–20 is transmitted electrically to the rotor of the corresponding receiving synchro.

Receiving unit 12 is small and compact, especially by comparison with the transmitting unit 11. Accordingly the read-out bank of receiving unit 12 may be installed in cramped quarters such as the cockpit of an airplane. Since receiving unit 12 has eliminated the use of a counter type gear train, since the receiving synchros 48 are independent of each other, and since the receiving synchros 48 have relatively few parts, the space available has been utilized to provide indicating wheels 53–56 with numerals marked thereon that are large and legible. Compare them, for example, with the size of the numerals on the indicating discs.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. Counter apparatus comprising a series of transmitting synchros each including a rotor and a stator, intermittently operated counter gear means connecting the rotors of adjacent transmitting synchros together so that intermittent counter movement is transferred between adjacent transmitting synchros, input means connected to said series of transmitting synchros, a remotely located read-out bank of receiving synchros each including a rotor and a stator and corresponding to said series of transmitting synchros, conductor means electrically connecting each transmitting synchro to its corresponding receiving synchro, an indicating drum supported on the rotor of each receiving synchro, and numerals marked on the cylindrical surface of each drum, whereby said transmitting synchros send a counter input to said receiving synchros for display thereby.

2. The counter apparatus defined in claim 1, wherein said conductor means electrically connects each transmitting synchro to the rotor of its corresponding receiving synchro.

3. The counter apparatus defined in claim 1, wherein each rotor of the transmitting synchros supports an indicating disc with numerals marked thereon.

4. The counter apparatus defined in claim 1 wherein is provided electrical terminals connected to the end of said conduit means, a pair of conducting rings mounted on the side of each of said indicating drums in a plane perpendicular to the axis of said drums, and spring means urging said terminals into contact with said rings.

5. The counter apparatus defined in claim 1, wherein each rotor of the receiving synchros is mechanically independent of the other rotors of the receiving synchros.

6. A synchro comprising a rotor mounted on a rotatable shaft, a stator positioned around the periphery of said rotor, an indicating drum mounted on said rotor and rotatable therewith, said drum having its cylindrical portion positioned around the periphery of said stator, numerals marked on the cylindrical portion of said drum, a pair of conducting rings mounted on the side of said indicating drum and electrically connected to the coil of said rotor, and electrical terminals in contact with said conducting rings.

7. A synchro comprising a casing, a rotor mounted on a rotatable shaft supported in said casing, said rotor having a rotor coil, a stator positioned around the periphery of said rotor inside said casing, an indicating drum mounted on said rotor and rotatable therewith, said drum having its cylindrical portion positioned around the periphery of said stator, numerals marked on the cylindrical portion of said drum, a pair of concentric conducting rings mounted on the side of said indicating wheel and electrically connected to the coil of said rotor, and electrical terminals mounted on said casing and in contact with said conducting rings.

References Cited in the file of this patent

UNITED STATES PATENTS

| | | |
|---|---|---|
| 1,215,815 | Kaminski | Feb. 13, 1917 |
| 1,504,609 | Crane | Aug. 12, 1924 |
| 1,850,640 | Sperry | Mar. 22, 1932 |
| 1,917,017 | Chantemerle | July 4, 1933 |
| 1,964,228 | Tanner | June 26, 1934 |
| 2,356,186 | Somers | Aug. 22, 1944 |
| 2,462,117 | Mikkelson | Feb. 22, 1949 |

OTHER REFERENCES

Basic Electricity, 1956, Navy Training Courses Navpers 10086, page 637.

United States Navy Synchros, a Joint Bureau of Ordnance and Bureau of Ships Publication Ordnance Pamphlet No. 1303, page 52.